US009553806B2

(12) United States Patent
Anand

(10) Patent No.: US 9,553,806 B2
(45) Date of Patent: Jan. 24, 2017

(54) METHOD AND SYSTEM FOR SUPPORTING PORT RANGING IN A SOFTWARE-DEFINED NETWORKING (SDN) SYSTEM

(71) Applicant: Telefonaktiebolaget L M Ericsson (publ), Stockholm (SE)

(72) Inventor: Prashant Anand, Bangalore (IN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 161 days.

(21) Appl. No.: 14/616,450

(22) Filed: Feb. 6, 2015

(65) Prior Publication Data

US 2016/0234112 A1 Aug. 11, 2016

(51) Int. Cl.
| | | |
|---|---|---|
| H04L 12/28 | (2006.01) | |
| H04L 12/56 | (2006.01) | |
| H04W 28/04 | (2009.01) | |
| H04L 12/701 | (2013.01) | |
| H04L 12/741 | (2013.01) | |
| H04L 12/721 | (2013.01) | |
| H04L 12/715 | (2013.01) | |
| H04L 29/12 | (2006.01) | |

(52) U.S. Cl.
CPC .............. *H04L 45/741* (2013.01); *H04L 12/28* (2013.01); *H04L 45/00* (2013.01); *H04L 45/38* (2013.01); *H04L 45/54* (2013.01); *H04L 45/64* (2013.01); *H04L 45/74* (2013.01); *H04W 28/04* (2013.01); *H04L 61/2517* (2013.01)

(58) Field of Classification Search
USPC ........................ 370/392, 254, 409, 428, 429, 395.31,370/395.32
See application file for complete search history.

(56) References Cited

U.S. PATENT DOCUMENTS

| | | | |
|---|---|---|---|
| 8,787,388 B1 | 7/2014 | Adams et al. | |
| 2013/0103817 A1* | 4/2013 | Koponen | G06F 9/45558 709/223 |
| 2013/0230047 A1 | 9/2013 | Subrahmaniam et al. | |
| 2014/0140344 A1 | 5/2014 | Krishnan et al. | |
| 2014/0328350 A1 | 11/2014 | Hao et al. | |
| 2015/0124815 A1* | 5/2015 | Beliveau | H04L 47/24 370/392 |

(Continued)

OTHER PUBLICATIONS

J. Postel, "User Datagram Protocol," Aug. 28, 1980, 3 pages, RFC: 768.

(Continued)

*Primary Examiner* — Phuongchau Ba Nguyen
(74) *Attorney, Agent, or Firm* — Nicholson De Vos Webster & Elliott LLP

(57) ABSTRACT

In one embodiment, a packet is processed by three flow tables in a network device of a software-defined networking (SDN) system. In the first flow table, upon finding a match based at least partially on an IP address value of the packet, the network device adds a first identifier based on the IP address value to metadata of the packet and forwards the packet to a second flow table, where upon finding a match based at least partially on a port value of the packet, the network device adds a second identifier based on the port value to the metadata and forwards the packet to a third flow table. At the third flow table, upon finding a match based at least partially on a combination of the first and second identifiers, the network device performs one set of instructions of the matching entry on the packet.

20 Claims, 7 Drawing Sheets

(56) References Cited

U.S. PATENT DOCUMENTS

2015/0172189 A1* 6/2015 Pitchai ............... H04L 45/7453
                                                   370/392
2016/0197831 A1* 7/2016 De Foy ............... H04L 45/7453
                                                   370/392

OTHER PUBLICATIONS

"Transmission Control Protocol, DARPA Internet Program Protocol Specification," Sep. 1981, 91 pages, RFC: 793, Information Sciences Institute, University of Southern California, Marina del Rey, California.
T. Socolofsky, et al., "A TCP/IP Tutorial," Jan. 1991, 28 pages, Network Working Group, Request for Comments: 1180.
S. Deering, et al., "Internet Protocol, Version 6 (IPv6) Specification," Dec. 1998, 39 pages, Network Working Group, Request for Comments: 2460, The Internet Society.
K. Nichols, et al., "Definition of the Differentiated Services Field (DS Field) in the IPv4 and IPv6 Headers," Dec. 1998, 20 pages, Network Working Group, Request for Comments: 2474, The Internet Society.
S. Blake, et al., "An Architecture for Differentiated Services," Dec. 1998, 36 pages, Network Working Group, Request for Comments: 2475, The Internet Society.
J. Heinanen, et al., "Assured Forwarding PHB Group," Jun. 1999, 11 pages, Network Working Group, Request for Comments: 2597, The Internet Society.
D. Borman, et al., "IPv6 Jumbograms," Aug. 1999, 9 pages, Network Working Group, Request for Comments: 2675, The Internet Society.
D. Black, "Differentiated Services and Tunnels," Oct. 2000, 14 pages, Network Working Group, Request for Comments: 2983, The Internet Society.
K. Nichols, et al., "Definition of Differentiated Services Per Domain Behaviors and Rules for their Specification," Apr. 2001, 24 pages, Network Working Group, Request for Comments: 3086, The Internet Society.
D. Black, et al., "Per Hop Behavior Identification Codes," Jun. 2001, 8 pages, Network Working Group, Request for Comments: 3140, The Internet Society.
B. Davie, et al., "An Expedited Forwarding PHB (Per-Hop Behavior)," Mar. 2002, 16 pages, Network Working Group, Request for Comments: 3246, The Internet Society.
A. Charny, et al., "Supplemental Information for the New Definition of the EF PHB (Expedited Forwarding Per-Hop Behavior)," Mar. 2002, 24 pages, Network Working Group, Request for Comments: 3247, The Internet Society.
D. Grossman, "New Terminology and Clarifications for Diffserv," Apr. 2002, 10 pages, Network Working Group, Request for Comments: 3260, The Internet Society.
F. Baker, et al., "Management Information Base for the Differentiated Services Architecture," May 2002, 116 pages, Network Working Group, Request for Comments: 3289, The Internet Society.
Y. Bernet, et al., "An Informal Management Model for Diffserv Routers," May 2002, 56 pages, Network Working Group, Request for Comments: 3290, The Internet Society.
K. Chan, et al., "Differentiated Services Quality of Service Policy Information Base," Mar. 2003, 96 pages, Network Working Group, Request for Comments: 3317, The Internet Society.
B. Fenner, et al., "Management Information Base for the User Datagram Protocol (UDP)," Jun. 2005, 19 pages, Network Working Group, Request for Comments: 4113, The Internet Society.
S. Kent, et al., "Security Architecture for the Internet Protocol," Dec. 2005, 101 pages, Network Working Group, Request for Comments: 4301, The Internet Society.
R. Housley, et al., "Using Advanced Encryption Standard (AES) CCM Mode with IPsec Encapsulating Security Payload (ESP)," Dec. 2005, 13 pages, Network Working Group, Request for Comments: 4309, The Internet Society.
E. Rosen, et al., "BGP/MPLS IP Virtual Private Networks (VPNs)," Feb. 2006, 47 pages, Network Working Group, Request for Comments: 4364, The Internet Society.
J. Babiarz, et al., "Configuration Guidelines for DiffServ Service Classes," Aug. 2006, 57 pages, Network Working Group, Request for Comments: 4594, The Internet Society.
K. Kompella, et al., "Virtual Private LAN Service (VPLS) Using BGP for Auto-Discovery and Signaling," Jan. 2007, 28 pages, Network Working Group, Request for Comments: 4761, The IETF Trust.
M. Lasserre, et al., "Virtual Private LAN Service (VPLS) Using Label Distribution Protocol (LDP) Signaling," Jan. 2007, 31 pages, Network Working Group, Request for Comments: 4762, The IETF Trust.
L. Eggert, et al., "Unicast UDP Usage Guidelines for Application Designers," Nov. 2008, 27 pages, Network Working Group, Request for Comments: 5405, IETF Trust and the persons identified as the document authors.
F. Baker, et al., "A Differentiated Services Code Point (DSCP) for Capacity-Admitted Traffic," May 2010, 14 pages, Internet Engineering Task Force (IETF).
Request for Comments: 5865, IETF Trust and the persons identified as the document authors.
"OpenFlow Switch Specification", Open Networking Foundation, Version 1.3.1 (Wire Protocol 0x04), Sep. 6, 2012, 128 pages.
"OpenFlow Switch Specification", Open Networking Foundation, Version 1.3.4 (Protocol version 0x04), Mar. 27, 2014, 171 pages.

\* cited by examiner

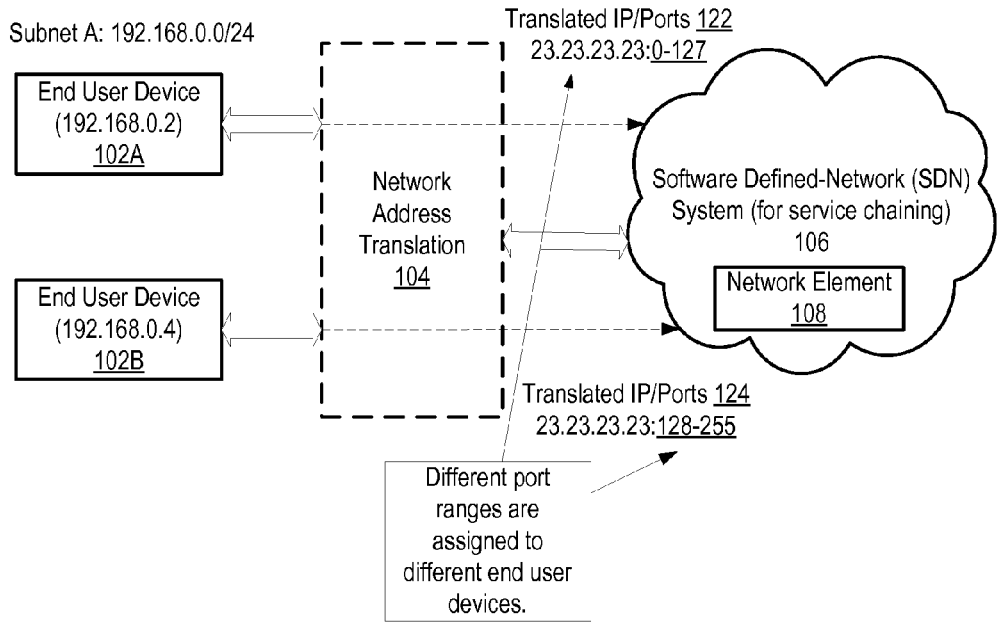
FIG. 1
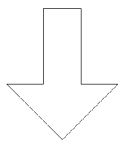
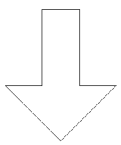
FIG. 2

```
Rule 1: SRC IP = 10.1.2.0/24, Port Range = 80-90 → Operation 1
Rule 2: SRC IP = 15.1.0.0/16, Port Range = 82-86 → Operation 2
                              302
```

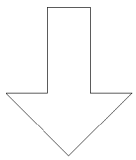

Forming Non-Overlapping Port Range to SDN operations. 312

```
SRC IP = 10.1.2.0/24, Port Range = 80-81 → Operation 1
SRC IP = 10.1.2.0/24, Port Range = 82-86 → Operation 1
SRC IP = 15.1.0.0/16, Port Range = 82-86 → Operation 2
SRC IP = 10.1.0.0/24, Port Range = 87-90 → Operation 1
                          304
```

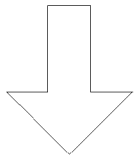

Setting Identifiers to ID IP/Port combinations. 314

```
SRC IP Identifier for 10.1.2.0/24 = 11, Range Identifier for Port 80-81 = 5 → Operation 1
SRC IP Identifier for 10.1.2.0/24 = 11, Range Identifier for Port 82-86 = 9 → Operation 1
SRC IP Identifier for 15.1.0.0/16 = 9,  Range Identifier for Port 82-86 = 11 → Operation 2
SRC IP Identifier for 15.1.0.0/16 = 9,  Range Identifier for Port 87-90 = 15 → Operation 1
                                       306
```

FIG. 3

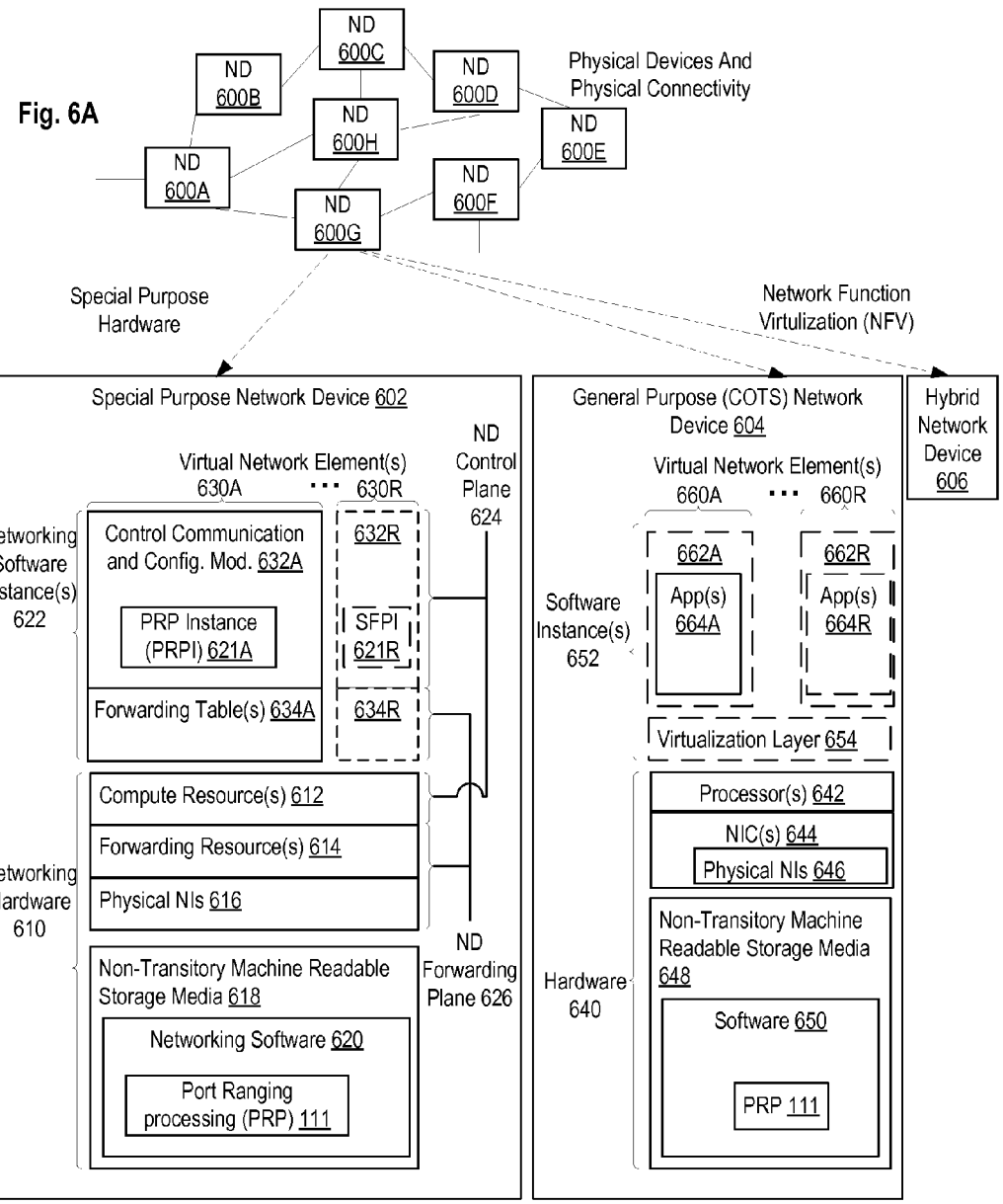

METHOD AND SYSTEM FOR SUPPORTING PORT RANGING IN A SOFTWARE-DEFINED NETWORKING (SDN) SYSTEM

FIELD OF INVENTION

The embodiments of the invention are related to the field of networking. More specifically, the embodiments of the invention relate to methods and systems for supporting port ranging in a software-defined networking (SDN) system.

BACKGROUND

Software-defined networking (SDN) is a network architecture that aims at decoupling control plane functions from data plane functions such that separate apparatuses may be utilized for different functions. In the SDN architecture, network intelligence and states are logically centralized, and the underlying network infrastructure is abstracted from the applications. As a result, networking may be simplified and new applications become feasible. For example, network virtualization can be accomplished by implementing it in a software application where the control plane is separated from the data plane. Also, a network administrator of a SDN system may have programmable central control of network traffic without requiring physical access to the system's hardware devices. With these benefits, SDN architecture based systems (referred to as SDN systems or SDN networks exchangeably herein below) are gaining popularity among carriers and enterprises.

For implementing SDN, the Open Networking Foundation (ONF), an industrial consortium focusing on commercializing SDN and its underlying technologies, has defined a set of open commands, functions, and protocols. The defined protocol suites are known as the OpenFlow (OF) protocol. In the OpenFlow protocol, packets of traffic flows are forwarded through one or more flow tables in an OpenFlow switch (a network element). Packets are matched against flow tables for forwarding decisions. In the process, a packet is matched to match fields of flow table entries of a flow table. The match can be an exact match, where a value extracted from the packet needs to be the same value of a corresponding match field to make a match; the match can also be a wildcard match where the value extracted from the packet can be any value to make a match; or the match can be a range match where the value extracted from the packet needs to be within a defined bounded range of values to make a match.

In networking, a port is an application-specific or process-specific software construct serving as a communications endpoint in a network device. The purpose of ports is to uniquely identify different applications or processes running on a single network device so that these applications and processes may share a single physical connection (e.g., network links between network devices). A port is typically associated with an Internet Protocol (IP) address, as well as the type of protocol used for Open System Interconnection (OSI) in layers 4-7, where the type of protocol may be the Transmission Control Protocol (TCP), User Datagram Protocol (UDP), and etc. In the OpenFlow protocol, packet matching for a port value is defined as an exact match only. However, in some applications, a range match for the port value is more advantageous.

SUMMARY

A method for port ranging is disclosed. The method is implemented in a network device coupled to a software-defined networking (SDN) system, where the SDN system contains a SDN controller managing the network device. The method includes receiving a packet at a first flow table in the network device, searching to find a matching entry in the first flow table based at least partially on an Internet Protocol (IP) address value of the packet, and upon finding the matching entry in the first flow table, adding a first identifier based on the IP address value to metadata of the packet and forwarding the packet to a second flow table in the network device. The method continues with receiving the packet at the second flow table, searching to find a matching entry in the second flow table based at least partially on a port value of the packet upon receiving the packet, and upon finding the matching entry in the second flow table, adding a second identifier based on the port value to the metadata, where the second identifier maps to one of a plurality of non-overlapping ranges of port values defined in the second flow table, forwarding the packet to a third flow table in the network device. The method continues with receiving the packet at the third flow table, searching to find a matching entry in the third flow table in the network device based at least partially on a combination of the first and second identifiers included in the metadata of the packet, and upon finding the matching entry in the third flow table, performing one set of instructions of the matching entry in the third flow table on the packet.

A network device for port ranging is disclosed. The network device is to be coupled to a software-defined networking (SDN) system, where the SDN system contains a SDN controller managing the network device. The network device comprises a processor and a non-transitory machine-readable storage medium coupled to the processor. The network device receives a packet at a first flow table in the network device, searches to find a matching entry in the first flow table based at least partially on an Internet Protocol (IP) address value of the packet, and upon finding the matching entry in the first flow table, adds a first identifier based on the IP address value to metadata of the packet and forwards the packet to a second flow table in the network device. The network device further receives the packet at the second flow table, searches to find a matching entry in the second flow table in the network device based at least partially on a port value of the packet upon receiving the packet, and upon finding the matching entry in the second flow table, adds a second identifier based on the port value to the metadata, where the second identifier maps to one of a plurality of non-overlapping ranges of port values defined in the second flow table, and forwards the packet to a third flow table in the network device. The network device further receives the packet at the third flow table, searches to find a matching entry in the third flow table in the network device based at least partially on a combination of the first and second identifiers included in the metadata of the packet, upon finding the matching entry in the third flow table, performs one set of instructions of the matching entry in the third flow table on the packet.

A non-transitory machine-readable storage medium having instructions stored for port ranging is disclosed. The instructions when executed by a processor, cause the process to perform operations in a network device coupled to a software-defined networking (SDN) system, where the SDN system contains the network device and a SDN controller managing the network device. The operations include receiving a packet at a first flow table in the network device, searching to find a matching entry in the first flow table based at least partially on an Internet Protocol (IP) address value of the packet, and upon finding the matching entry in the first flow table, adding a first identifier based on the IP address value to metadata of the packet and forwarding the packet to a second flow table in the network device. The operations continue with receiving the packet at the second flow table, searching to find a matching entry in the second flow table based at least partially on a port value of the packet upon receiving the packet, and upon finding the matching entry in the second flow table, adding a second identifier based on the port value to the metadata, where the second identifier maps to one of a plurality of non-overlapping ranges of port values defined in the second flow table, forwarding the packet to a third flow table in the network device. The operations continue with receiving the packet at the third flow table, searching to find a matching entry in the third flow table in the network device based at least partially on a combination of the first and second identifiers included in the metadata of the packet, and upon finding the matching entry in the third flow table, performing one set of instructions of the matching entry in the third flow table on the packet Embodiments of the technique aim at improving the efficiency of port matching for packet forwarding in a SDN system. Through a set of flow tables, packets with port values in specific ranges may be forwarded in a network device that complies with the OpenFlow protocol. Thus, the SDN system implementing embodiments of the technique supports port ranges in flow table match rule without changing the OpenFlow protocol the network device complies with.

BRIEF DESCRIPTION OF THE DRAWINGS

The present invention is illustrated by way of example, and not by way of limitation, in the figures of the accompanying drawings in which like references indicate similar elements.

FIG. 1 illustrates the need of port ranging in a SDN system.

FIG. 2 illustrates creation of non-overlapping port ranges according to one embodiment of the invention.

FIG. 3 illustrates creation of non-overlapping port ranges according to another embodiment of the invention.

FIG. 6A illustrates connectivity between network devices (NDs) within an exemplary network, as well as three exemplary implementations of the NDs, according to some embodiments of the invention.

FIG. 6B illustrates an exemplary way to implement a special-purpose network device according to some embodiments of the invention.

DETAILED DESCRIPTION

Figure 4A:
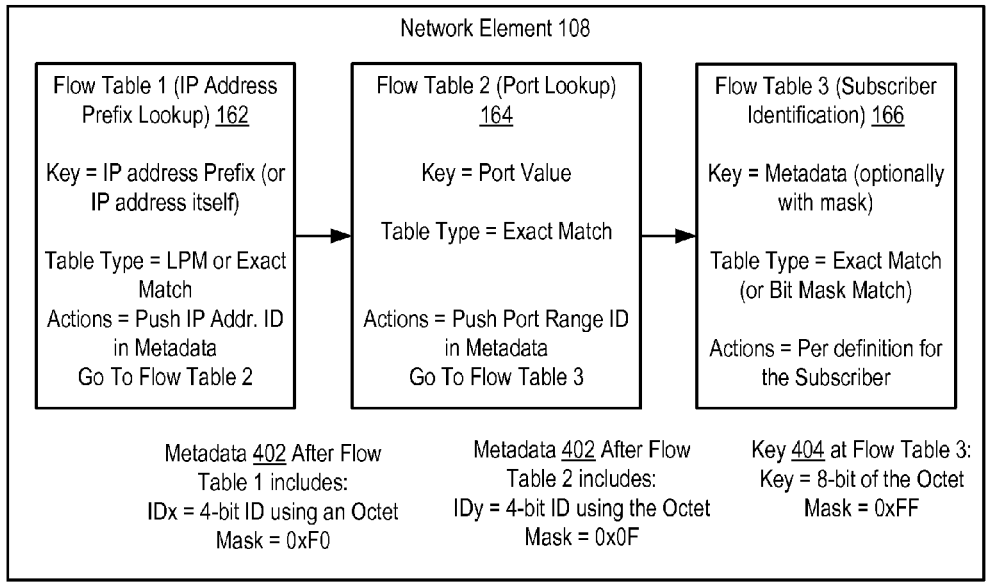
FIG. 4A illustrates operations of packet processing in a network element implementing port ranging according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). As explained in more details herein below, a network element may be implemented in one or more network devices, and a network device may implement one or more network elements.

Port Ranging in a SDN System

According to the OpenFlow protocol, port matching in a flow table is defined only for an exact match. Yet, in applications such as service chaining, it is desirable for packets to be matched based on a range of port values of the packets. In service chaining, packets of traffic flows go through more than one service in a software-defined networking (SDN) system. The packets of traffic flows from a particular end user may go through a specific service chain, based on a service level agreement (SLA) between the particular end user and the operator of the SDN system providing the service chains.

FIG. 1 illustrates the need of port ranging in a SDN system. The SDN system 106 provides applications such as service chaining for end user devices 102A and 102B. The SDN system 106 contains network elements such as network element 108 (which is implemented in one or more network devices) provide services for the end user devices (e.g., service chaining) End user devices 102A and 102B have their respective private IP address, but they are in the same subnet.

If the service chaining is to be implemented without the network address translation (NAT), the SDN system may identify a particular end user using its private IP address only. In this example, end user devices 102A and 102B are identified by 192.168.0.2 and 192.168.0.4 respectively. The service chaining can be performed for the particular end user devices 102 and 102 in SDN system 106 by network element 108. However, using private network address limits the scalability of the SDN system, and a NAT such as NAT 104 is often inserted between the end user devices and the SDN system.

Through NAT, a private IP address (representing an end user device) is given an IP address in a public network, with a range of port numbers associated with the IP address. Each port number may be a 16-bit unsigned integer from 0 to 65,535, and it is generally associated with an application for the end user device. As known in the art, there are well known ports in the range of 0 and 1,023, registered ports in the range of 1024 and 49,151, and dynamic or private ports in the range of 49,152 and 65,535. The NAT generally assigns a range of ports for the given IP address.

In this example, the NAT gives the same IP address 23.23.23.23 to end user devices 102A and 102B, but with different port ranges, the former being 0-127, and the latter being 128-255. Thus, through the NAT, the different end user devices can be differentiated through their respective port ranges, even though they are assigned to the same IP address by the NAT. The NAT insertion between the end user devices and the SDN system occurs in application such as residential services, where a residential gateway implements NAT functionalities. Identifying an end user device using a combination of an IP address and a range of ports is useful in such application.

In current SDN standards such as the OpenFlow protocol, a port number of a packet is not matched with a range of port number for flow table to make packet forwarding decisions. Instead, the matching for the port number is an exact number—the value of a packet port needs to be exactly equal to a port number within a match field of a flow table entry for a match to be declared. In contrast, an IP address matching can be an exact match or a longest prefix match (LPM) (also referred to as maximum prefix length match), where in the LPM, the most specific flow table entry with the longest subnet mask matching the IP address is determined to be the matching flow table entry. The rigidity of exact port number matching does not work well in applications where a range of port numbers are defined, and each range is associated with a particular traffic flow (e.g., the traffic flow from a particular end user).

Creation of Non-Overlapping Port Ranges

As known in the art, flow tables in a SDN system are generated from a set of rules. The set of rules is typically received at a SDN controller (also referred to as a network controller), which coordinates packets of traffic flows being forwarded in a set of network elements, which implemented in network devices as discussed in more details below. In order to identify packets of traffic flows based on an IP address and a range of port values, the set of rules needs to be converted to another set of rules, where each rule is for a unique combination of an IP address and non-overlapping range of port values.

When the ranges of port values are overlapping, there are two types: partial overlapping where a subset of the port ranges between two ranges overlaps, or full overlapping where one port range is the superset of the other port range.

FIG. 2 illustrates creation of non-overlapping port ranges according to one embodiment of the invention. At reference 202, there are two rules received for generating flow tables for a network element. According to rule 1, for packets with a source IP address subnet of 10.1.2.0/24 and a port range of 80-84, a first operation (Operation 1) is to be performed on the packets. According to rule 2, for packet with a source IP address subnet of 15.1.0.0/16 and a port range of 82-86, a second operation (Operation 2) is to be performed on the packets.

It is to be noted that the IP address can be specified to be for destination IP addresses for other rules, as the rules can be for matching either the source IP address or the destination IP address of the packets. The port number can be for TCP protocol, UDP protocol, or other applicable protocols. The operations can be a set of actions, including dropping the packet, pushing data into or popping data out of metadata of the packet, modifying values of packet header, and etc. For creating all the flow tables of a network element, generally many more rules are received, a portion of which may specify the source/destination IP addresses or the source/destination IP address subnets as well as port ranges, and these rules are the ones embodiments of the invention apply to generate a set of flow tables.

It is to be noted that the port ranges in rules 1 and 2 are partially overlapping, that is, the port range between 82 and 84 is overlapped between the two rules. When a network element implementing this set of rules encounters a packet with a port number between 82 and 84, without knowing the packet's source IP address, it will have a hard time to know whether to perform operations 1 or 2. Thus, the combination of the source IP address and the port range is needed to uniquely identify which operation is to be applied to a packet.

From the set of rules at reference 202, another set of rules containing non-overlapping port ranges are formed through reference 212. The rules includes:

For packets with source IP address subnet 10.1.2.0/24, port range=80-81, performing operation 1;
For packets with source IP address subnet 10.1.2.0/24, port range=82-84, performing operation 1;
For packets with source IP address subnet 15.1.0.0/16, port range=82-84, performing operation 2;
For packets with source IP address subnet 15.1.0.0/16, port range=85-86, performing operation 2.

The new sets of rules are non-overlapping, where each range of the port numbers along with the source IP address subnet unequivocally maps to an operation. The source IP addresses and the port ranges may be further converted to identifiers, which makes matching decision easier to make as discussed herein below in more details. At reference 214, the identifiers are set to identify the IP address and port range combinations. The results are the new sets of rules identified by numerical numbers instead of IP address subnets and port ranges at reference 206. In this example, the source IP identifiers are set to be 11 and 9 respectively for the source IP subnet 10.1.2.0/24 and 15.1.0.0/16; the range identifiers are set to be 5, 8, and 12 respectively for port ranges 80-81, 82-84, and 85-86. Through using identifiers, the new rules are easier to implement for generating flow tables.

FIG. 3 illustrates creation of non-overlapping port ranges according to another embodiment of the invention. FIG. 3 is similar to FIG. 2, and one difference is that the port range, where the port range in rule 1 is the superset of the port range in rule 2. That is, the port range 82-86 is within the port range 80-90. The non-overlapping port ranges are split into 80-81, 82-86, and 87-90 as illustrated at reference 304. These non-overlapping port ranges are each assigned to a unique port identifier as illustrated at reference 306, similar to the unique source IP identifiers at references 304 and 306.

Operations with Non-Overlapping Port Range

FIG. 4A illustrates operations of packet processing in a network element implementing port ranging according to one embodiment of the invention. Network element 108 may be implemented in a network device and it contains three flow tables, flow tables 1-3 at references 162, 164, and 166 respectively. Each table contains a key for matching its flow table entries. A key contains one or more match key components, the values of which are extracted from the packet, and the key value(s) are compared to values of the match fields of flow table entries. Upon a match being identified, the packet is processed according to the action(s) specified in the set of instruction of the match flow table entry.

Flow table 1 is to match the IP address, and the key can be an IP address prefix (e.g., subnet of the IP address) or an IP address itself. The IP address can be either the source or the destination IP address of an incoming packet. The table type indicates the kind of match to be applied to the incoming packet. The actions are included in the instruction sets of the flow table entries. The actions include pushing the IP address identifier corresponding to (1) the IP address prefix or (2) the IP address itself to metadata of the packet. The metadata is data attached to a packet during the process of the packet in a network element. In the OpenFlow protocol, the metadata is implemented as a maskable register value that is used to carry information from one flow table to the next. The actions also include forwarding the packet to flow table 2 (through a command Go To Flow Table 2), after the metadata of the packet is updated.

Upon that flow table 1 identifies a packet matches a flow table entry, the IP address identifier, identified as illustrated in FIGS. 2-3, is to be pushed to the metadata of the packet. Thus, after a packet is processed through flow table 1, its metadata 402 includes the IP address ID. In one embodiment, the IP address ID may be converted into a bit value. In this example, the ID is converted to a four bit value stored in an octet (i.e., a byte), where a mask=0XF0 is applied so that only the specific four bit values are updated due to the pushing of the IP address ID.

The packet is then forwarded to flow table 2, which is to match the port number of a packet, and the key is the port value of the packet. The table type of flow table 2 is an exact match. Thus, flow table 2 for port matching complies with the OpenFlow protocol, and network element 108 may generate flow table 2 for port matching without deviating from the OpenFlow protocol. The actions in flow table 2 upon matching includes pushing a port range identifier corresponding to the port value of the packet to the metadata of the packet. The action also includes forwarding the packet to flow table 2, after the metadata of the packet is updated.

Upon that flow table 2 identifies a packet matches a flow table entry, the port range identifier, identified as illustrated in FIGS. 2-3, is to be pushed to the metadata of the packet. Thus, after a packet is processed through flow table 2, its metadata 402 further includes the port range ID. In one embodiment, the port range ID may be converted into a bit value. In this example, the ID is converted to a four bit value stored in the same octet storing the IP address ID, and a different mask=0X0F is applied so that only the specific four bit values are updated due to the pushing of the port range identifier without changing the IP address identifier, which was pushed in the metadata earlier.

The packet is then forwarded to flow table 3, which is to perform the operations defined for the packet based on the packet forwarding rule such as the ones illustrated in FIGS. 2-3. The key of table 3 is the metadata of the packet. The table type of flow table 3 can be an exact match or a masked match. The masked match is through a bit mask, where only some of the bits in the key are used for the match. In this embodiment, the whole octet comprising the IP address identifier and the port range identifier is used as the key, thus the effect of the exact match or the bit masked match is the same.

Upon that flow table 3 identifies a packet matching the IP address identifier and the port range identifier, the action as defined by the rules will be applied to the packet. The matching IP address identifier and the port range identifier maps the packet to a rule as illustrated in references 206 and 306. Thus, the defined operations (such as Operations 1 and 2 in the rules from which the flow tables are generated) are applied to the packet.

In this embodiment, a single octet is used for matching, and the exact and bit masked matches yield the same result. In other embodiment, more octets may be used for the IP address identifier and the port range identifier may be used, and bit masked match would be preferable to the exact match. For example, if IP address identifier is stored in the first four bits of one register and the port range identifier is stored in the first four bits of another register, the bit mask match of 0xF0F0 may be used to compare the combination of the two octets to the values of the match fields of the flow table entries. It is to be noted that the IP address identifiers and the port range identifiers can be converted to any number of bits other than the four bits illustrated. Different bit masks may be used for matching depending on the allocated bit lengths of IP address identifiers and the port range identifiers.

Figure 4B:
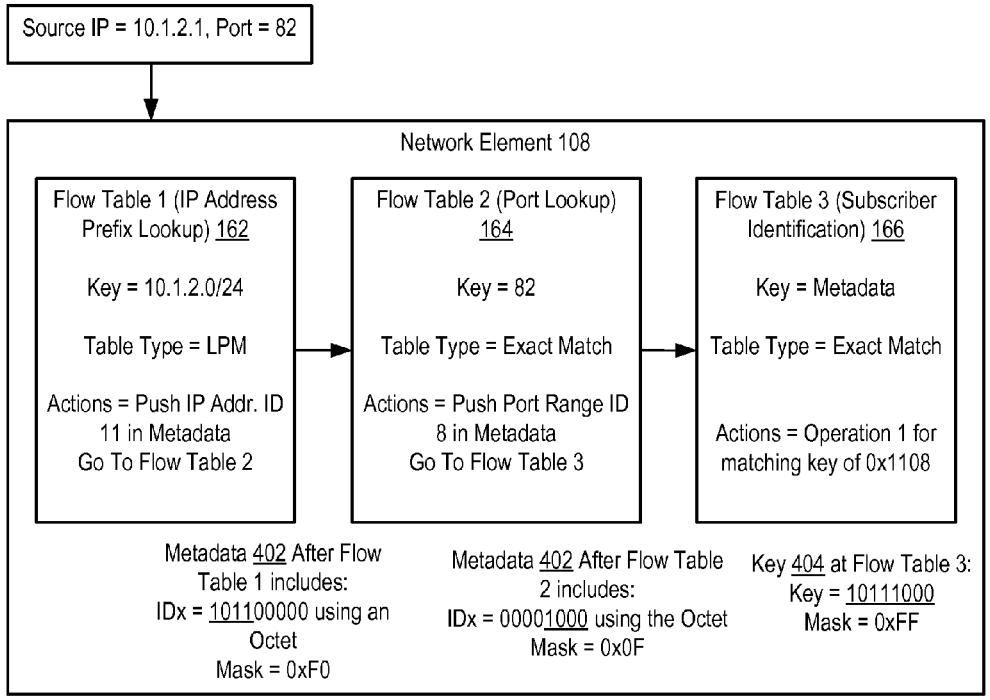
FIG. 4B illustrates operations of an incoming packet being processed in a network element implementing port ranging according to one embodiment of the invention.

FIG. 4B illustrates operations of an incoming packet being processed in a network element implementing port ranging according to one embodiment of the invention. FIG. 4B is similar to FIG. 4A, and it is an example where a packet 455 is forwarded through the flow tables 1-3. Packet 455 contains source IP address 10.1.2.1, and its associated port 82. According to rules illustrated in FIGS. 2-3, Operation 1 should be performed on packet 455.

Packet 455 is received at network element 108, which forwards the packet to flow table 1. Because the corresponding IP address identifier is 11, the IP address ID 1011 is pushed into the metadata of packet 455. The value of a register storing the metadata is set to 10110000 in this example. It is noted that the a bit mask 0xF0 (11110000) is applied to the register. Thus the prior value of the last four bits of the register is irrelevant and can be any value.

Packet 455 is then forwarded to flow table 2, where the corresponding port range identifier 8 is pushed into the metadata of packet 455. The port range identifier is pushed to the same register that holds the IP address identifier, but the port range identifier is stored in the last four bits of the register through applying a bit mask 0x0F (00001111). Thus, the metadata is updated at the last four bits value, and the register value becomes 10111000.

Packet 455 is then forwarded to flow table 3, where the metadata is the key for matching. Upon that the packet matches the key where mask of 0xFF (11111111) is applied, the Operation 1 as defined for traffic flow complying with rule 1 is applied to packet 455.

Flow Diagrams for Implementing Port Ranging

Figure 5:
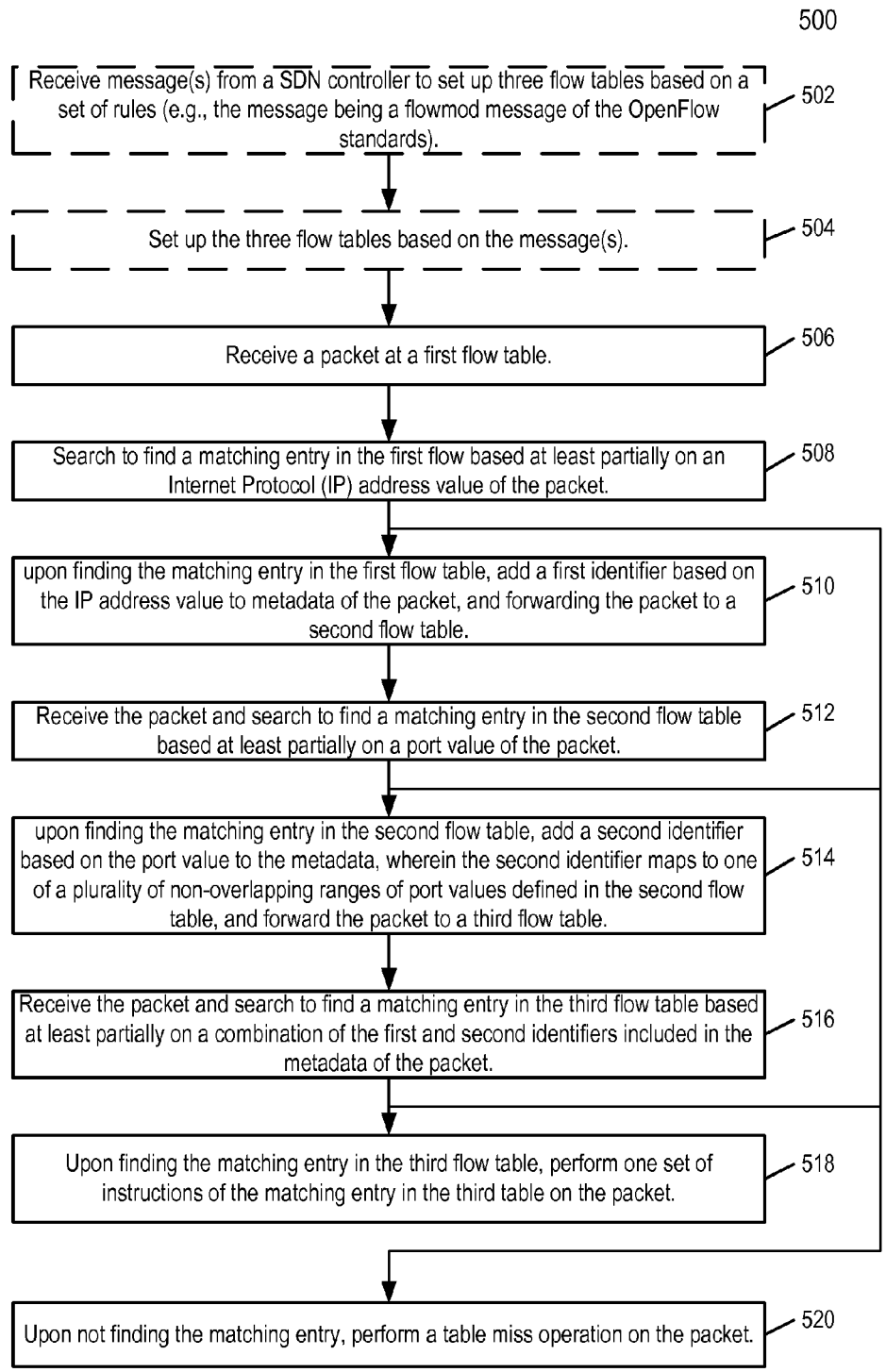
FIG. 5 is a flow diagram illustrating implementation of port ranging according to one embodiment of the invention.

FIG. 5 is a flow diagram illustrating implementation of port ranging according to one embodiment of the invention. Method 500 may be implemented in network element 108 of FIG. 1 according to one embodiment of the invention. Network element 108 may be implemented in one or more network devices.

At reference 502, one or more messages is received from the SDN controller to set up three flow tables. In one embodiment, the network element may make the determination as of how the three flow tables for port ranging should be generated based on a set of rules for the network element. In an alternative embodiment, the SDN controller may make the determination, in which case, the messages may be flow modification messages such as flow-mod messages defined in the OpenFlow standard. At reference 504, the three flow tables are generated in the network element based on the received messages.

Each of the set of rules includes (1) at least one of an IP address and an IP address prefix (e.g., a IP subnet); (2) a range of port values, including a single port value, but at least one rule contains a range of plurality of port values; and (3) a set of instructions to be performed on a packet having the at least one of an IP address and an IP address prefix and the range of port values. It is to be noted that the set of rules may be a subset of a larger set of rules that do not meet the criteria, and the SDN controller may create flow tables other than the three flow tables as discussed herein for a network element.

At reference 506, a packet is received at a first flow table. At reference 508, the first flow table is searched to find a matching entry in the first flow table based at least partially on an IP address value of the packet. The matching is through a key value extracted from the packet. The key may be an IP address or an IP address prefix (IP subnet), and the IP address of the packet is extracted to be the key value, which is to be compared with values of the corresponding match fields of the flow table entries of the first flow table. The match type may be an exact match or an LPM match as discussed herein above. It is to be noted that the IP address can be for either source or destination IP addresses.

Upon a matching entry is found in the first flow table at reference 510, the network element adds a first identifier based on the IP address value to metadata of the packet and forwards the packet to a second flow table in the network element. The operations may be based on the set of instructions in the matching entry. The first identifier may be converted to a set of bits to be stored in one or more registers for the metadata. In one embodiment, a bit mask may be used when storing the first identifier to the one or more registers so that bits other than the ones representing the first identifier (corresponding to the IP address/IP address prefix) are not affected. The adding the first identifier to the metadata may be performed through a push action as defined in the OpenFlow protocol.

At reference 512, the second flow table receives the packet and the network element searches the second flow table to find a matching entry in the second flow table based at least partially on a port value of the packet upon receiving the packet. The matching is through a key value (port number) extracted from the packet. The match is an exact match. The port numbers are for TCP or UDP in one embodiment thus may be referred to as the TCP ports or UDP ports.

Upon a matching entry is found in the second flow table at reference 514, the network element adds a second identifier based on the port value to the metadata of the packet and forwards the packet to a third flow table in the network element. The operations in reference 514 is similar to the operations in 510. The difference is that the second identifier is based on a port value, and the second identifier maps to one of a plurality of non-overlapping ranges of port values defined in the second flow table. Each range may include at least one port number, and at least one range includes two or more consecutive port numbers.

The second identifier will be stored in a different bit position of the metadata of the packet. In one embodiment, the metadata storing the first and the second identifiers are in the same data unit. In one embodiment, the same data unit is an octet.

At reference 516, the third flow table receives the packet and the network element searches the third flow table to find a matching entry in the third flow table based at least partially on a combination of the first and the second identifiers included in the metadata of the packet. If the matching entry is found in the third flow table entry, the network element performs one set of instructions of the matching entry on the packet.

When no matching entry is found in either first, second, or third flow table, the flow goes to reference 520, where the network element performs a table miss operation for the respective flow table. For example, the table miss operation may include sending a request to the SDN controller managing the network element for guidance as of how to handle the packet. The table miss operation may also include dropping the packet, in which case, the packet will no longer go through the remaining flow table in the flow table chain.

It is to be noted that all the matching is at least partially based on the entities specified: the IP address, the port value, and the combination of the first and second identifiers. The matching may be based on additional entities, e.g., VLAN identifiers, time-to-live counters in the packet headers, and the key for matching may include values of these additional entities.

Through embodiments of the invention, port ranging based match is supported without any modification to the OpenFlow protocol. Thus, any network element in compliance with the OpenFlow protocol may implement embodiments of the invention. The utilized search/matching methods are what is known in the art: the exact/LPM matching in the first flow table, the exact matching in the second flow table, and the exact/bit masked in the third flow table. None of the search/matching method utilized in the embodiments of the invention requires a costly search engine such as ternary content-addressable memory (TCAM) search.

SDN and NFV Environment Utilizing Embodiments of the Invention

Embodiments of the invention may be utilized in a SDN and NFV network containing network devices. FIG. 6A illustrates connectivity between network devices (NDs) within an exemplary network, as well as three exemplary implementations of the NDs, according to some embodiments of the invention. FIG. 6A shows NDs 600A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 600A, E, and F illustrates that these NDs act as ingress and egress points for the network (and thus, these NDs are sometimes referred to as edge NDs; while the other NDs may be called core NDs).

Two of the exemplary ND implementations in FIG. 6A are: 1) a special-purpose network device 602 that uses custom application-specific integrated-circuits (ASICs) and a proprietary operating system (OS); and 2) a general purpose network device 604 that uses common off-the-shelf (COTS) processors and a standard OS.

The special-purpose network device 602 includes networking hardware 610 comprising compute resource(s) 612 (which typically include a set of one or more processors), forwarding resource(s) 614 (which typically include one or more ASICs and/or network processors), and physical network interfaces (NIs) 616 (sometimes called physical ports), as well as non-transitory machine readable storage media 618 having stored therein networking software 620, which contains port ranging processing (PRP) module 111 containing instructions for the operations of forwarding packets based on port ranging as discussed herein above. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 600A-H. During operation, the PRP module 111 may be executed by the networking hardware 610 to instantiate a set of one or more PRP instances 621A-R. Each of the PRP instances 621A-R, and that part of the networking hardware 610 that executes that PRP instance (be it hardware dedicated to that load balancer instance and/or time slices of hardware temporally shared by that load balancer instance with others of the networking software instance(s) 622), form a separate virtual network element 630A-R. Each of the virtual network element(s) (VNEs) 630A-R includes a control communication and configuration module 632A-R (sometimes referred to as a local control module or control communication module) and forwarding table(s) 634A-R, such that a given virtual network element (e.g., 630A) includes the control communication and configuration module (e.g., 632A), a set of one or more forwarding table(s) (e.g., 634A), and that portion of the networking hardware 610 that executes the virtual network element (e.g., 630A). It is to be noted that the forwarding tables 634A-634R include the flow tables such as first, second, and third flow tables (port ranging flow tables) discussed herein above.

The special-purpose network device 602 is often physically and/or logically considered to include: 1) a ND control plane 624 (sometimes referred to as a control plane) comprising the compute resource(s) 612 that execute the control communication and configuration module(s) 632A-R; and 2) a ND forwarding plane 626 (sometimes referred to as a forwarding plane, a data plane, or a media plane) comprising the forwarding resource(s) 614 that utilize the forwarding table(s) 634A-R and the physical NIs 616. By way of example, where the ND is a router (or is implementing routing functionality), the ND control plane 624 (the compute resource(s) 612 executing the control communication and configuration module(s) 632A-R) is typically responsible for participating in controlling how data (e.g., packets) is to be routed (e.g., the next hop for the data and the outgoing physical NI for that data) and storing that routing information in the forwarding table(s) 634A-R, and the ND forwarding plane 626 is responsible for receiving that data on the physical NIs 616 and forwarding that data out the appropriate ones of the physical NIs 616 based on the forwarding table(s) 634A-R.

FIG. 6B illustrates an exemplary way to implement the special-purpose network device 602 according to some embodiments of the invention. FIG. 6B shows a special-purpose network device including cards 638 (typically hot pluggable). While in some embodiments the cards 638 are of two types (one or more that operate as the ND forwarding plane 626 (sometimes called line cards), and one or more that operate to implement the ND control plane 624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)).

By way of example, a service card may be used to terminate IPsec tunnels and execute the attendant authentication and encryption algorithms. These cards are coupled together through one or more interconnect mechanisms illustrated as backplane 636 (e.g., a first full mesh coupling the line cards and a second full mesh coupling all of the cards).

Returning to FIG. 6A, the general purpose network device 604 includes hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein software 650, which contains PRP module 111. During operation, the processor(s) 642 execute the software 650 to instantiate one or more sets of one or more applications 664A-R, including instances of PRP module 111. While one embodiment does not implement virtualization, alternative embodiments may use different forms of virtualization—represented by a virtualization layer 654 and software containers 662A-R. For example, one such alternative embodiment implements operating system-level virtualization, in which case the virtualization layer 654 represents the kernel of an operating system (or a shim executing on a base operating system) that allows for the creation of multiple software containers 662A-R that may each be used to execute one of the sets of applications 664A-R. In this embodiment, the multiple software containers 662A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 654 represents a hypervisor (sometimes referred to as a virtual machine monitor (VMM)) or a hypervisor executing on top of a host operating system; and 2) the software containers 662A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 664A-R, as well as the virtualization layer 654 and software containers 662A-R if implemented, are collectively referred to as software instance(s) 652. Each set of applications 664A-R, corresponding software container 662A-R if implemented, and that part of the hardware 640 that executes them (be it hardware dedicated to that execution and/or time slices of hardware temporally shared by software containers 662A-R), forms a separate virtual network element(s) 660A-R.

The virtual network element(s) 660A-R perform similar functionality to the virtual network element(s) 630A-R—e.g., similar to the control communication and configuration module(s) 632A and forwarding table(s) 634A (this virtualization of the hardware 640 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 662A-R differently. For example, while embodiments of the invention are illustrated with each software container 662A-R corresponding to one VNE 660A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 662A-R to VNEs also apply to embodiments where such a finer level of granularity is used.

In certain embodiments, the virtualization layer 654 includes a virtual switch that provides similar forwarding services as a physical Ethernet switch. Specifically, this virtual switch forwards traffic between software containers 662A-R and the NIC(s) 644, as well as optionally between the software containers 662A-R; in addition, this virtual switch may enforce network isolation between the VNEs 660A-R that by policy are not permitted to communicate with each other (e.g., by honoring virtual local area networks (VLANs)).

The third exemplary ND implementation in FIG. 6A is a hybrid network device 606, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 602) could provide for para-virtualization to the networking hardware present in the hybrid network device 606.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 630A-R, VNEs 660A-R, and those in the hybrid network device 606) receives data on the physical NIs (e.g., 616, 646) and forwards that data out the appropriate ones of the physical NIs (e.g., 616, 646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

Figure 6C:
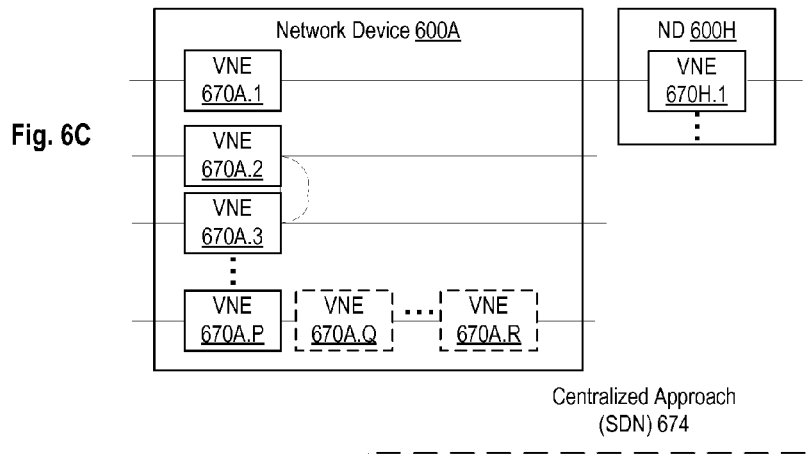
FIG. 6C illustrates various exemplary ways in which virtual network elements (VNEs) may be coupled according to some embodiments of the invention.

FIG. 6C illustrates various exemplary ways in which VNEs may be coupled according to some embodiments of the invention. FIG. 6C shows VNEs 670A.1-670A.P (and optionally VNEs 670A.Q-670A.R) implemented in ND 600A and VNE 670H.1 in ND 600H. In FIG. 6C, VNEs 670A.1-P are separate from each other in the sense that they can receive packets from outside ND 600A and forward packets outside of ND 600A; VNE 670A.1 is coupled with VNE 670H.1, and thus they communicate packets between their respective NDs; VNE 670A.2-670A.3 may optionally forward packets between themselves without forwarding them outside of the ND 600A; and VNE 670A.P may optionally be the first in a chain of VNEs that includes VNE 670A.Q followed by VNE 670A.R (this is sometimes referred to as dynamic service chaining, where each of the VNEs in the series of VNEs provides a different service—e.g., one or more layer 4-7 network services). While FIG. 6C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 6A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 6A may also host one or more such servers (e.g., in the case of the general purpose network device 604, one or more of the software containers 662A-R may operate as servers; the same would be true for the hybrid network device 606; in the case of the special-purpose network device 602, one or more such servers could also be run on a virtualization layer executed by the compute resource(s) 612); in which case the servers are said to be co-located with the VNEs of that ND.

A virtual network is a logical abstraction of a physical network (such as that in FIG. 6A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

Figure 6D:
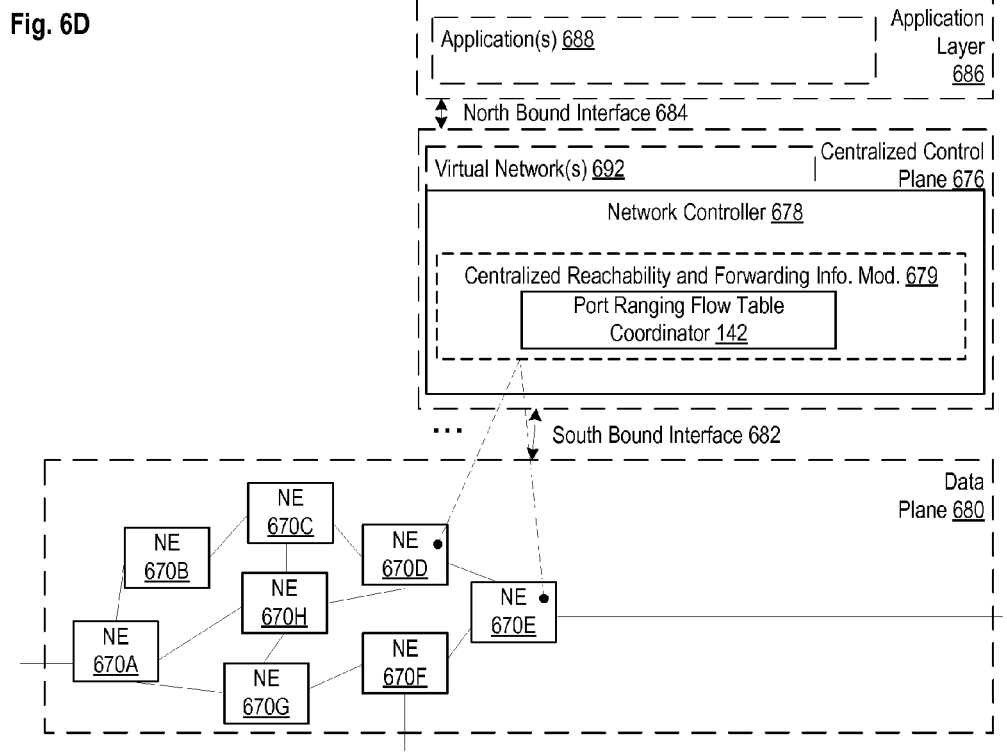
FIG. 6D illustrates a network with a single network element (NE) on each of the NDs, and with a centralized approach for maintaining reachability and forwarding information (also called network control), according to some embodiments of the invention.

FIG. 6D illustrates a network with a single network element on each of the NDs of FIG. 6A according to some embodiments of the invention. FIG. 6D illustrates network elements (NEs) 670A-H with the same connectivity as the NDs 600A-H of FIG. 6A.

FIG. 6D illustrates a network with a single network element on each of the NDs of FIG. 6A, and with a centralized approach for maintaining reachability and forwarding information (also called network control), according to some embodiments of the invention. Specifically, FIG. 6D illustrates network elements (NEs) 670A-H with the same connectivity as the NDs 600A-H of FIG. 6A.

FIG. 6D illustrates that a centralized approach 674 (also known as software defined networking (SDN)) that decouples the system that makes decisions about where traffic is sent from the underlying systems that forwards traffic to the selected destination. The illustrated centralized approach 674 has the responsibility for the generation of reachability and forwarding information in a centralized control plane 676 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 676 has a south bound interface 682 with a data plane 680 (sometime referred to the infrastructure layer, network forwarding plane, or forwarding plane (which should not be confused with a ND forwarding plane)) that includes the NEs 670A-H (sometimes referred to as switches, forwarding elements, data plane elements, or nodes). The centralized control plane 676 includes a network controller 678, which includes a centralized reachability and forwarding information module 679 that determines the reachability within the network and distributes the forwarding information to the NEs 670A-H of the data plane 680 over the south bound interface 682 (which may use the OpenFlow protocol). Thus, the network intelligence is centralized in the centralized control plane 676 executing on electronic devices that are typically separate from the NDs. The centralized reachability and forwarding information module 679 contains a port range flow table coordinator 142. Port ranging flow table coordinator 142 coordinates generating and updating of the port range flow tables in network elements 670A-670H (such as the flow tables 1, 2, and 3 illustrated in FIG. 4A-B) in one embodiment. In one embodiment, port ranging flow table coordinator 142 sends flow-mod requests to the network elements for generating and updating of symmetric flow tables as discussed herein above.

Where the special-purpose network device 602 is used in the data plane 680, each of the control communication and configuration module(s) 632A-R of the ND control plane 624 typically include a control agent that provides the VNE side of the south bound interface 682. In this case, the ND control plane 624 (the compute resource(s) 612 executing the control communication and configuration module(s) 632A-R) performs its responsibility for participating in controlling how data (e.g., packets) is to be routed (e.g., the next hop for the data and the outgoing physical NI for that data) through the control agent communicating with the centralized control plane 676 to receive the forwarding information (and in some cases, the reachability information) from the centralized reachability and forwarding information module 679 (it should be understood that in some embodiments of the invention, the control communication and configuration module(s) 632A-R, in addition to communicating with the centralized control plane 676, may also play some role in determining reachability and/or calculating forwarding information—albeit less so than in the case of a distributed approach; such embodiments are generally considered to fall under the centralized approach 674, but may also be considered a hybrid approach).

While the above example uses the special-purpose network device 602, the same centralized approach 674 can be implemented with the general purpose network device 604 (e.g., each of the VNE 660A-R performs its responsibility for controlling how data (e.g., packets) is to be routed (e.g., the next hop for the data and the outgoing physical NI for that data) by communicating with the centralized control plane 676 to receive the forwarding information (and in some cases, the reachability information) from the centralized reachability and forwarding information module 679; it should be understood that in some embodiments of the invention, the VNEs 660A-R, in addition to communicating with the centralized control plane 676, may also play some role in determining reachability and/or calculating forwarding information—albeit less so than in the case of a distributed approach) and the hybrid network device 606. In fact, the use of SDN techniques can enhance the NFV techniques typically used in the general purpose network device 604 or hybrid network device 606 implementations as NFV is able to support SDN by providing an infrastructure upon which the SDN software can be run, and NFV and SDN both aim to make use of commodity server hardware and physical switches.

FIG. 6D also shows that the centralized control plane 676 has a north bound interface 684 to an application layer 686, in which resides application(s) 688. The centralized control plane 676 has the ability to form virtual networks 692 (sometimes referred to as a logical forwarding plane, network services, or overlay networks (with the NEs 670A-H of the data plane 680 being the underlay network)) for the application(s) 688. Thus, the centralized control plane 676 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 6D illustrates the simple case where each of the NDs 600A-H implements a single NE 670A-H, it should be understood that the network control approaches described with reference to FIG. 6D also work for networks where one or more of the NDs 600A-H implement multiple VNEs (e.g., VNEs 630A-R, VNEs 660A-R, those in the hybrid network device 606). Alternatively or in addition, the network controller 678 may also emulate the implementation of multiple VNEs in a single ND. Specifically, instead of (or in addition to) implementing multiple VNEs in a single ND, the network controller 678 may present the implementation of a VNE/NE in a single ND as multiple VNEs in the virtual networks 692 (all in the same one of the virtual network(s) 692, each in different ones of the virtual network(s) 692, or some combination). For example, the network controller 678 may cause an ND to implement a single VNE (a NE) in the underlay network, and then logically divide up the resources of that NE within the centralized control plane 676 to present different VNEs in the virtual network(s) 692 (where these different VNEs in the overlay networks are sharing the resources of the single VNE/NE implementation on the ND in the underlay network).

Figure 6E:
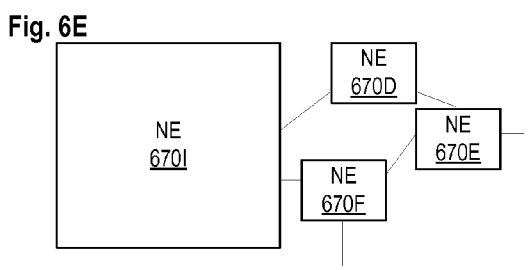
FIG. 6E illustrates the simple case of where each of the NDs implements a single NE, but a centralized control plane has abstracted multiple of the NEs in different NDs into (to represent) a single NE in one of the virtual network(s), according to some embodiments of the invention.
Figure 6F:
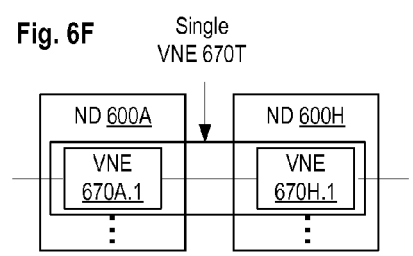
FIG. 6F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 6E and 6F respectively illustrate exemplary abstractions of NEs and VNEs that the network controller 678 may present as part of different ones of the virtual networks 692. FIG. 6E illustrates the simple case of where each of the NDs 600A-H implements a single NE 670A-H (see FIG. 6D), but the centralized control plane 676 has abstracted multiple of the NEs in different NDs (the NEs 670A-C and G-H) into (to represent) a single NE 670I in one of the virtual network(s) 692 of FIG. 6D, according to some embodiments of the invention. FIG. 6E shows that in this virtual network, the NE 670I is coupled to NE 670D and 670F, which are both still coupled to NE 670E.

FIG. 6F illustrates a case where multiple VNEs (VNE 670A.1 and VNE 670H.1) are implemented on different NDs (ND 600A and ND 600H) and are coupled to each other, and where the centralized control plane 676 has abstracted these multiple VNEs such that they appear as a single VNE 670T within one of the virtual networks 692 of FIG. 6D, according to some embodiments of the invention. Thus, the abstraction of a NE or VNE can span multiple NDs.

While some embodiments of the invention implement the centralized control plane 676 as a single entity (e.g., a single instance of software running on a single electronic device), alternative embodiments may spread the functionality across multiple entities for redundancy and/or scalability purposes (e.g., multiple instances of software running on different electronic devices).

Figure 7:
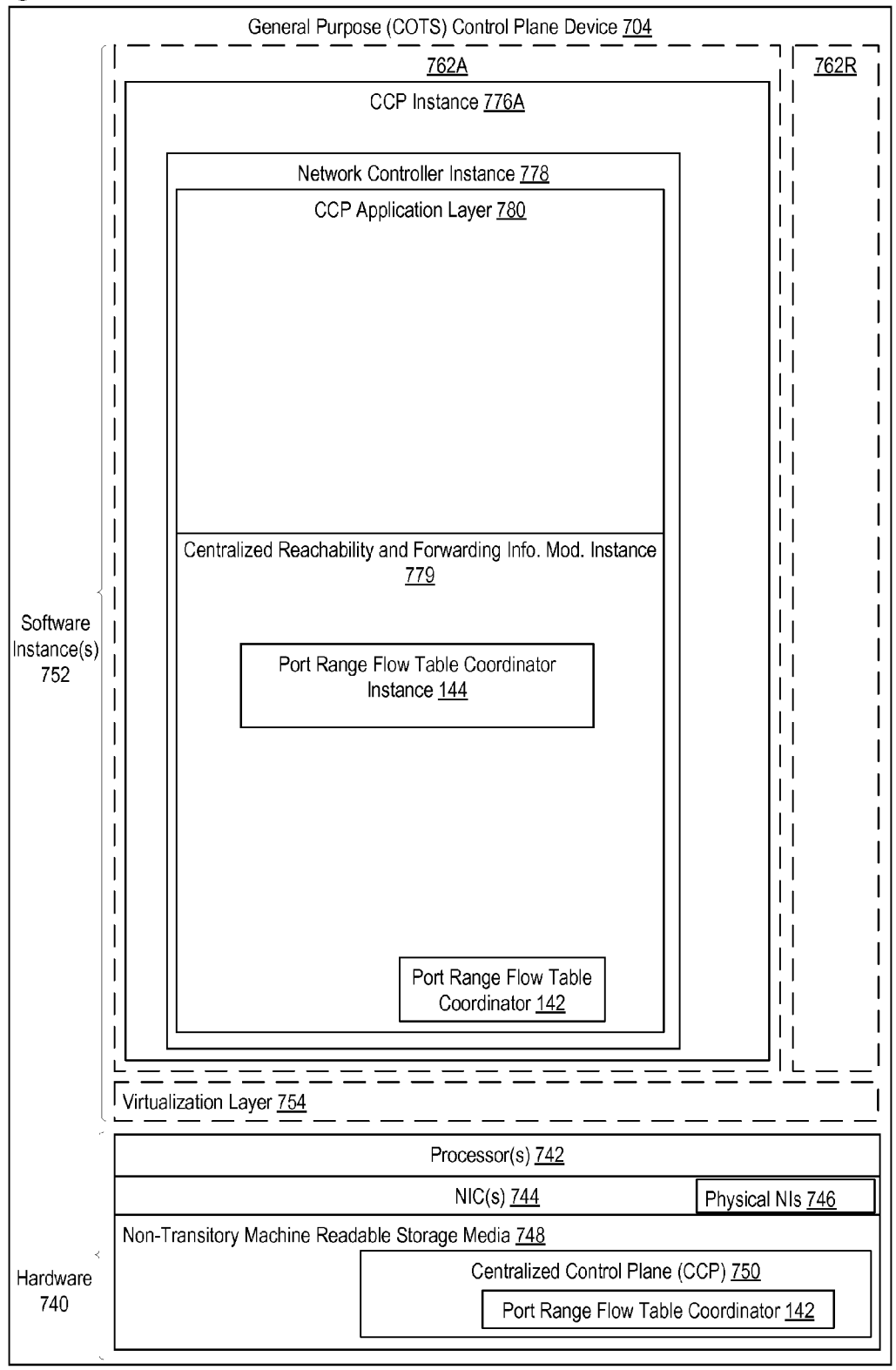
FIG. 7 illustrates a general purpose control plane device with centralized control plane (CCP) software 750), according to some embodiments of the invention.

Similar to the network device implementations, the electronic device(s) running the centralized control plane 676, and thus the network controller 678 including the centralized reachability and forwarding information module 679, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 7 illustrates, a general purpose control plane device 704 including hardware 740 comprising a set of one or more processor(s) 742 (which are often COTS processors) and network interface controller(s) 744 (NICs; also known as network interface cards) (which include physical NIs 746), as well as non-transitory machine readable storage media 748 having stored therein centralized control plane (CCP) software 750.

In embodiments that use compute virtualization, the processor(s) 742 typically execute software to instantiate a virtualization layer 754 and software container(s) 762A-R (e.g., with operating system-level virtualization, the virtualization layer 754 represents the kernel of an operating system (or a shim executing on a base operating system) that allows for the creation of multiple software containers 762A-R (representing separate user space instances and also called virtualization engines, virtual private servers, or jails) that may each be used to execute a set of one or more applications; with full virtualization, the virtualization layer 754 represents a hypervisor (sometimes referred to as a virtual machine monitor (VMM)) or a hypervisor executing on top of a host operating system, and the software containers 762A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in embodiments where compute virtualization is used, during operation an instance of the CCP software 750 (illustrated as CCP instance 776A) is executed within the software container 762A on the virtualization layer 754. In embodiments where compute virtualization is not used, the CCP instance 776A on top of a host operating system is executed on the "bare metal" general purpose control plane device 704. The instantiation of the CCP instance 776A, as well as the virtualization layer 754 and software containers 762A-R if implemented, are collectively referred to as software instance(s) 752.

In some embodiments, the CCP instance 776A includes a network controller instance 778. The network controller instance 778 includes a centralized reachability and forwarding information module instance 779 (which is a middleware layer providing the context of the network controller 678 to the operating system and communicating with the various NEs), and an CCP application layer 780 (sometimes referred to as an application layer) over the middleware layer (providing the intelligence required for various network operations such as protocols, network situational awareness, and user-interfaces). At a more abstract level, this CCP application layer 780 within the centralized control plane 676 works with virtual network view(s) (logical view(s) of the network) and the middleware layer provides the conversion from the virtual networks to the physical view. It is to be noted that CCP 750 contains port range flow table coordinator 142, which is instantiated as port range flow table coordinator instance 144 within CCP instance 776A. The port range flow table coordinator instance coordinates generating and updating of the port range flow tables in network elements 670A-670H in one embodiment as discussed herein above.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 680, the packet (or a subset of the packet header and content) is typically forwarded to the centralized control plane 676. The centralized control plane 976 will then program forwarding table entries into the data plane 680 to accommodate packets belonging to the flow of the unknown packet. Once a specific forwarding table entry has been programmed into the data plane 680 by the centralized control plane 676, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Each VNE (e.g., a virtual router, a virtual bridge (which may act as a virtual switch instance in a Virtual Private LAN Service (VPLS) (RFC 4761 and 4762) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

The operations of the flow diagram FIG. 5 are described with reference to the exemplary embodiment of FIGS. 1, 4A-B, and 6-7. However, it should be understood that the operations of flow diagrams can be performed by embodiments of the invention other than those discussed with reference to the exemplary embodiment of FIGS. 1, 4A-B, and 6-7, and the exemplary embodiment of FIGS. 1, 4A-B, and 6-7 can perform operations different than those discussed with reference to the flow diagrams of FIG. 5.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

Different embodiments of the invention may be implemented using different combinations of software, firmware, and/or hardware. Thus, the techniques shown in the figures can be implemented using code and data stored and executed on one or more electronic devices (e.g., an end system, a network device). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented in a network device coupled to a software-defined networking (SDN) system, wherein the SDN system contains a SDN controller managing the network device, the method comprising:
   receiving a packet at a first flow table in the network device,
   searching to find a matching entry in the first flow table based at least partially on an Internet Protocol (IP) address value of the packet;
   upon finding the matching entry in the first flow table, adding a first identifier based on the IP address value to metadata of the packet, and
   forwarding the packet to a second flow table in the network device;
   receiving the packet at the second flow table;
   searching to find a matching entry in the second flow table based at least partially on a port value of the packet upon receiving the packet;
   upon finding the matching entry in the second flow table, adding a second identifier based on the port value to the metadata, wherein the second identifier maps to one of a plurality of non-overlapping ranges of port values defined in the second flow table, and
   forwarding the packet to a third flow table in the network device;
   receiving the packet at the third flow table;
   searching to find a matching entry in the third flow table in the network device based at least partially on a combination of the first and second identifiers included in the metadata of the packet; and
   upon finding the matching entry in the third flow table, performing one set of instructions of the matching entry in the third flow table on the packet.

2. The method of claim 1, wherein the first identifier and the second identifier are assigned to a same data unit in the metadata of the packet, and wherein the assignment to the identifiers is performed through different masks of the same data unit for the first identifier and the second identifier.

3. The method of claim 2, wherein the same data unit is an octet.

4. The method of claim 1, wherein the searching to find the matching entry in the third flow table is to identify the matching entry with an exact match of the combination of the first and second identifier.

5. The method of claim 1, wherein the first, second, and third flow tables are generated based at least partially on messages received from the SDN controller.

6. The method of claim 5, wherein the received message are sent based at least partially on a set of rules, wherein each rule includes:
   at least one of an IP address and an IP address prefix;
   a range of port values; and
   a set of instructions to be performed on a packet having the at least one of an IP address and an IP address prefix and the range of port values.

7. The method of claim 1, wherein the port value of the packet is a value of transmission control protocol (TCP) port or user datagram protocol (UDP) port.

8. The method of claim 1, further comprimising:
   upon not finding the matching entry in the first, second, or third flow table, performing a table miss operation associated with the respective flow tables on the packet.

9. A network device coupled to a software-defined networking (SDN) system, wherein the SDN system contains a plurality of network devices forwarding traffic flows and a SDN controller managing the network device, the network device comprising:

a processor and a non-transitory machine-readable storage medium coupled to the processor, the non-transitory machine-readable storage medium containing operations executable by the processor, wherein the network device is operative to:

receive a packet at a first flow table in the network device, searching to find a matching entry in the first flow table based at least partially on an Internet Protocol (IP) address value of the packet, upon finding the matching entry in the first flow table,
add a first identifier based on the IP address value to metadata of the packet, and
forward the packet to a second flow table in the network device, receive the packet at the second flow table, search to find a matching entry in the second flow table in the network device based at least partially on a port value of the packet upon receiving the packet, upon finding the matching entry in the second flow table,
add a second identifier based on the port value to the metadata, wherein the second identifier maps to one of a plurality of non-overlapping ranges of port values defined in the second flow table, and
forward the packet to a third flow table in the network device, receive the packet at the third flow table, search to find a matching entry in the third flow table in the network device based at least partially on a combination of the first and second identifiers included in the metadata of the packet, and upon finding the matching entry in the third flow table, perform one set of instructions of the matching entry in the third flow table on the packet.

10. The network device of claim 9, wherein the first identifier and the second identifier are to be assigned to a same data unit in the metadata of the packet, and wherein the assignment to the identifiers is to be performed through different masks of the same data unit for the first identifier and the second identifier.

11. The network device of claim 10, wherein the same data unit is an octet.

12. The network device of claim 9, wherein the searching to find the matching entry in the third flow table is to identify the matching entry with an exact match of the combination of the first and second identifier.

13. The network device of claim 9, wherein the first, second, and third flow tables are to be generated based at least partially on messages received from the SDN controller.

14. The network device of claim 9, wherein the port value of the packet is a value of transmission control protocol (TCP) port or user datagram protocol (UDP) port.

15. A non-transitory machine-readable storage medium having instructions stored therein, which when executed by a processor, cause the processor to perform operations in a network device coupled to a software-defined networking (SDN) system, wherein the SDN system contains the network device and a SDN controller managing the network device, the operations comprising:

receiving a packet at a first flow table in the network device, searching to find a matching entry in the first flow table based at least partially on an Internet Protocol (IP) address value of the packet;

upon finding the matching entry in the first flow table,
adding a first identifier based on the IP address value to metadata of the packet, and
forwarding the packet to a second flow table in the network device;

receiving the packet at the second flow table;

searching to find a matching entry in the second flow table based at least partially on a port value of the packet upon receiving the packet;

upon finding the matching entry in the second flow table,
adding a second identifier based on the port value to the metadata, wherein the second identifier maps to one of a plurality of non-overlapping ranges of port values defined in the second flow table, and
forwarding the packet to a third flow table in the network device;

receiving the packet at the third flow table;

searching to find a matching entry in the third flow table in the network device based at least partially on a combination of the first and second identifiers included in the metadata of the packet; and upon finding the matching entry in the third flow table, performing one set of instructions of the matching entry in the third flow table on the packet.

16. The non-transitory machine-readable storage medium of claim 15, wherein the first identifier and the second identifier are assigned to a same data unit in the metadata of the packet, and wherein the assignment to the identifiers is performed through different masks of the same data unit for the first identifier and the second identifier.

17. The non-transitory machine-readable storage medium of claim 16, wherein the same data unit is an octet.

18. The non-transitory machine-readable storage medium of claim 15, wherein the searching to find the matching entry in the third flow table is to identify the matching entry with an exact match of the combination of the first and second identifier.

19. The non-transitory machine-readable storage medium of claim 15, the first, second, and third flow tables are generated based at least partially on messages received from the SDN controller.

20. The non-transitory machine-readable storage medium of claim 15, wherein the operations further comprises:

upon not finding the matching entry in the first, second, or third flow table, performing a table miss operation associated with the respective flow tables on the packet.

* * * * *